United States Patent
Carter et al.

(10) Patent No.: US 7,139,221 B1
(45) Date of Patent: Nov. 21, 2006

(54) CLOSE RANGE SONAR SYSTEM AND METHOD

(75) Inventors: G. Clifford Carter, Waterford, CT (US); Mary H. Johnson, Middletown, RI (US); David J. Pistacchio, Narragansett, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 231 days.

(21) Appl. No.: 10/915,270

(22) Filed: Aug. 11, 2004

(51) Int. Cl.
*G01S 3/80* (2006.01)
(52) U.S. Cl. .................................................. 367/125
(58) Field of Classification Search ................ 367/909, 367/118, 125, 126, 99, 119
See application file for complete search history.

(56) References Cited
U.S. PATENT DOCUMENTS

| | | | |
|---|---|---|---|
| 5,142,505 A | 8/1992 | Peynaud | |
| 5,400,300 A | 3/1995 | Bick et al. | |
| 5,708,626 A | 1/1998 | Hrubes | |
| 5,969,665 A | 10/1999 | Yufa | |
| 6,249,241 B1 | 6/2001 | Jordan et al. | |
| 2003/0227823 A1* | 12/2003 | Carter et al. | 367/107 |

* cited by examiner

*Primary Examiner*—Dan Pihulic
(74) *Attorney, Agent, or Firm*—James M. Kasischke; Jean-Paul A. Nasser; Michael P. Stanley

(57) ABSTRACT

A system for close range sonar is provided. The system provides sufficient warning to permit maneuvering to avoid a close encounter even in the forward starboard/port regions, which have been problematic in the past due to ownship noise. The system utilizes a hull mounted sonar array and a towed sonar array which may be controlled in position to provide sufficient separation of noise received by both sonar arrays such that the noise is largely uncorrelated. The system utilizes beamformers for each array to supply a cross-correlator section which is able to minimize the ownship noise and maximize the signal thereby providing more time for maneuvering. The system also provides a LOFAR display and other displays that are highly sensitive to detecting close encounters.

13 Claims, 2 Drawing Sheets

CLOSE RANGE SONAR SYSTEM AND METHOD

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to sonar systems and, more particularly, to a close range sonar system for improved ambiguity resolution and increased heading/bearing resolution for underwater acoustic radiators.

(2) Description of the Prior Art

It is highly desirable to accurately and quickly determine the relative positions of acoustic radiators Timely and accurate information becomes important in certain situations.

Presently, the performance of some sonar systems has been determined to be less than optimal due to low signal-to-noise ratio (SNR) and noise problems. For instance, the flow of fluid creates considerable noise which hampers data collection/analysis Ambiguity resolution is therefore problematic without executing a ship maneuver. Towed arrays have been considered for such functions, but the performance of the towed array in the direction of the forward sector (i.e., end-fire) is perhaps even more hampered by ownship noise.

Various patents have addressed related issues but do not address the present problems.

U.S. Pat. No. 5,142,505, issued Aug. 25, 1992, to Francois Peynaud, discloses a sonar for avoiding sub-surface underwater objects, for a surface vessel, having its directivity in elevation optimized to observe the surface and its surface reverberation reduced to the minimum. It consists in using an acoustic antenna having two columns of n transducers, the first column insonifying, at transmission, an elevation sector corresponding to the close encounter-risk zone and forming channels at reception, in the insonified elevation sector, the width of the channels being all the finer as the desired precision of the measurement of the position in elevation is high. The second column is necessary for the localization in relative bearing. The disclosure can be applied to the precise localization in elevation of objects located in the path of a vessel.

U.S. Pat. No. 5,303,204, issued Apr. 12, 1994, to Shalom Wertsberger, discloses a device to warn a ship crew of submerged objects in their immediate vicinity, combined with alarm and logging facilities. The device is composed of one or more sonic or ultra sonic transducers placed aboard the ship, with coverage arranged so as to give surrounding "envelope" to the sides and to the area ahead of the vessel, as well as some predetermined downward looking angle. The transducer or transducers are connected to an electronic distance measuring device that will measure distance to possible obstacles, similar to conventional sonar techniques. The measurements in each direction are compared by an electronic processor against a table of minimum distances, and if the distance falls below the predetermined value for a given direction, an alarm is activated. In addition, all alarms, cancellations of alarms, activation and deactivation of the system are logged automatically with an identification of the operator.

U.S. Pat. No. 5,400,300, issued Mar. 21, 1995, to Bick et al., discloses a system for providing advance warning of underwater navigation hazards that threaten safe ship passage. The system includes a sonar transmitter/receiver adapted for mounting on the ship in a forward looking direction. A processor, in response to sonar returns produced by the sonar transmitter/receiver, produces a sonar produced slope profile of a region of the sea bottom in front of the path of the vessel. A memory stores a slope profile of the region of the sea bottom in front of the vessel, such profile being developed from charted depth data. The stored charted depth data developed slope profile is compared with the sonar return produced slope profile to determine whether the sonar produced slope profile and the charted depth data slope profile are consistent with each other. If the sonar return produced slope profile in a region of the sea bottom is greater that a predetermined threshold level (selected to identify a potential forward undersea hazard) and the charted depth data generated profile of such region does not indicate this potential hazard, an anomaly is identified and a signal indicating such anomaly is produced.

U.S. Pat. No. 5,708,626, issued Jan. 13, 1998, to J. Dana Hrubes, discloses a system for determining the velocity and trajectory of an underwater vehicle which comprises a data acquisition processor coupled to a plurality of sensors providing depth, heading, pitch and yaw data for the underwater vehicle. The acquisition processor collects data from the sensors, correlates and assembles the collected data into batches and processes the batches to determine vehicle velocity and trajectory of the vehicle relative to an earth-fixed coordinate system.

U.S. Pat. No. 5,969,665, issued Oct. 19, 1999, to Aleksandr L. Yufa, discloses a method and apparatus which provide a control of the vessel maneuvering by a determination and displaying of the dangerous relative course zones, wherein the end of the vessel speed-vector should not be located for the object evasion tactic maneuvering and/or close encounter avoidance maneuvering and should be located for the object pursuit and/or interception tactic maneuvering. The apparatus comprises an object disposition evaluator, a control system, a dangerous criteria setting system, an initial data processor, at least one display and a dangerous relative course zone determiner, including an interface-signal distributor, a logic processor and signal distributor and a data processing system, comprising a trigonometric function processor, a summator, a multiplier-divider and a data processor. The dangerous relative course zones are displayed on at least one indicator, providing the operator with the possibility to evaluate the danger approach situation and instantly select the anti-collision maneuver for collision preventive maneuvering and/or select an optimal maneuver for the assigned vessel tactic maneuvering execution.

U.S. Pat. No. 6,249,241, issued Jun. 19, 2001, to Jordan et al., discloses a marine Vessel Traffic System (VTS) that is an improved radar harbor surveillance sensor, computer and display system that monitors marine harbor traffic, that provides advisories to vessels in areas selected by the system operators, and that provides the operators of the system with an early warning of unacceptable traffic conflicts in the confined waterways of the harbor. The VTS collects harbor traffic information from multiple remote sensor collection sites around the harbor and integrates, records, merges and presents the remote site data onto a single operator display, selected from a plurality of operator displays. VTS provides quick accurate computer generated graphic display of the harbor traffic, possible surface and subsurface conflicts, and key vessel identification information and the VTS documents incidents and traffic conditions for the Coast Guard or other waterway authorities.

It would be desirable to improve sonar performance in the forward sector and to provide a rapid resolution of port/starboard ambiguity resolution. These functions are required if our submarines are to safely and effectively maneuver in close encounter situations. The solutions to the above-described problems have been long sought without success. Consequently, those skilled in the art will appreciate the present invention that addresses the above and other problems.

SUMMARY OF THE INVENTION

It is a general purpose and object of the present invention to provide an improved close range sonar system.

It is another purpose and object of the present invention to provide a close range sonar system that is effective in the forward starboard/port directions.

These and other objects, features, and advantages of the present invention will become apparent from the drawings, the descriptions given herein, and the appended claims. However, it will be understood that above listed objects and advantages of the invention are intended only as an aid in understanding aspects of the invention, are not intended to limit the invention in any way, and do not form a comprehensive list of objects, features, and advantages.

Accordingly, the present invention provides an underwater sonar system for working accurately as a close range sonar between an ownship underwater platform and other underwater platforms. The system may comprise one or more elements such as, for instance, a first sonar array mounted to the ownship underwater platform wherein the first sonar array is operable for detecting acoustic pressure waves from the other underwater platform as well as acoustic pressure waves comprising noise. An example of such noise may be ownship noise produced by water flowing past the hull of the submarine. A second sonar array is secured to the ownship underwater platform by an extendable cable. The second sonar array is also operable for detecting acoustic pressure waves from the other platform but is placed at a distance such that the noise, which may be ownship noise due to the propeller, is uncorrelated from the noise received by the first sonar array. The cable may be adjusted in length as necessary such that the first sonar array noise and the second sonar array noise is substantially uncorrelated.

A first beamformer receives signals related to the acoustic pressure waves detected by the first sonar array and a second beamformer receives signals related to the acoustic pressure waves detected by the second sonar array. A correlator is preferably utilized for correlating respective outputs from the first beamformer and the second beamformer to thereby minimize the first sonar array noise and the second sonar array noise. In one embodiment, the correlator comprises a SCOT transform.

The system may further comprise a bearing-time display operable from an output of the correlator or derivative thereof.

The system may further comprise a time domain to frequency domain transfer function for operating on a signal downstream from the correlated signal produced by the correlator or derivative thereof to determine frequency characteristics thereof. A long averaging module and a short averaging module may be simultaneously utilized for operating on the frequency domain shifted signal or derivative thereof. Additionally, the system may further comprise a subtractor for subtracting the long averaging signal with respect to the short averaging signal.

A first display is preferably operatively connected to the long averaging signal and a second display operatively connected to the short averaging signal, and a third display operatively connected to a subtracted signal from the subtractor. The first display, the second display, and the third display are operable for indicating a close encounter between the ownship underwater platform and the other platform.

In operation of the invention, a method for avoiding a close encounter between an ownship platform and another underwater platform is provided. The method may comprise steps such as, for instance, mounting a first sonar array to a hull of the ownship, receiving acoustic signals from the first sonar array related to the other platform and a first sonar array noise, providing a second sonar array attached to a cable extendable from the ownship, and receiving acoustic signals from the second sonar array related to the other platform and a second sonar array noise.

Other steps may comprise correlating the acoustic signals received from the first sonar array and the second sonar array to minimize the first sonar array noise and the second sonar array noise while maximizing sonar signals related to other underwater platform. The method may further comprise determining a position of the other platform with respect to the ownship underwater platform for close range operations.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DESCRIPTION OF THE PREFERRED EMBODIMENT

Figure 1:
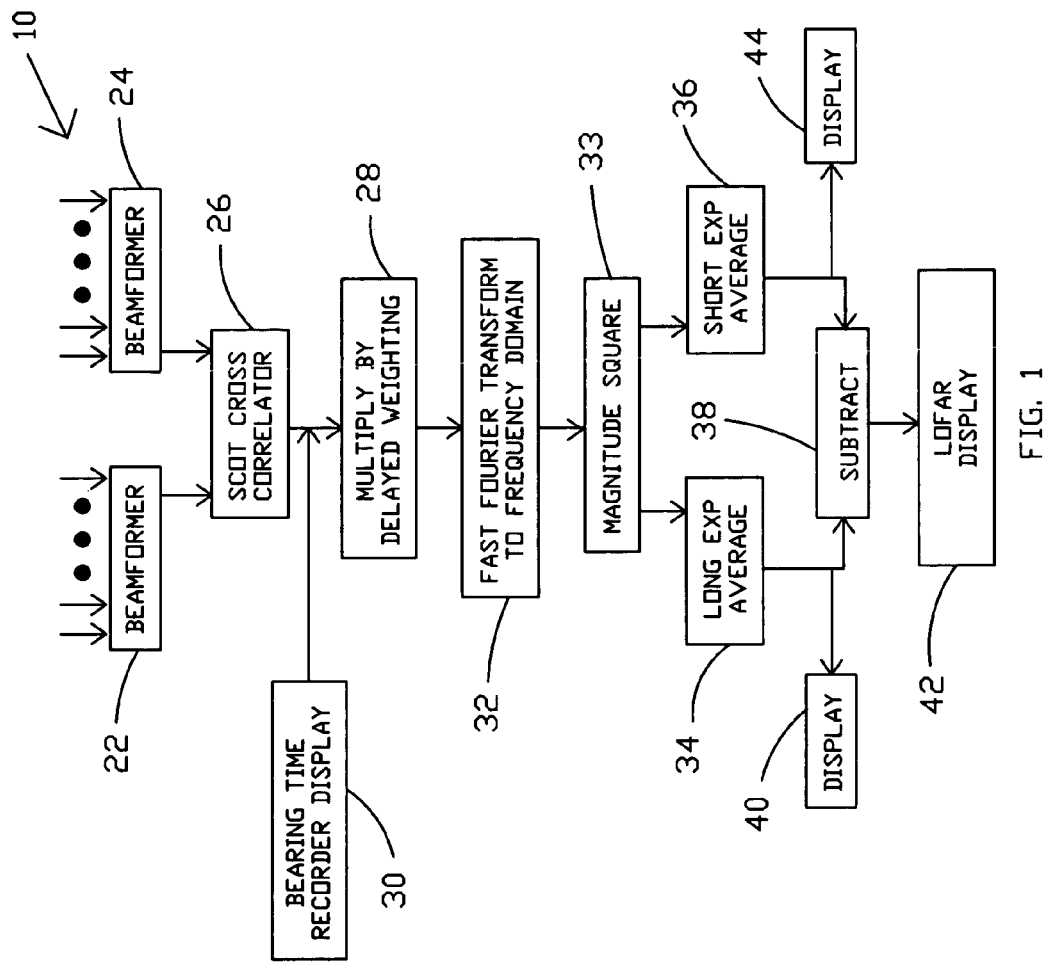
FIG. 1 is a block diagram for a submarine sonar close encounters avoidance system in accord with the present invention.
Figure 2:
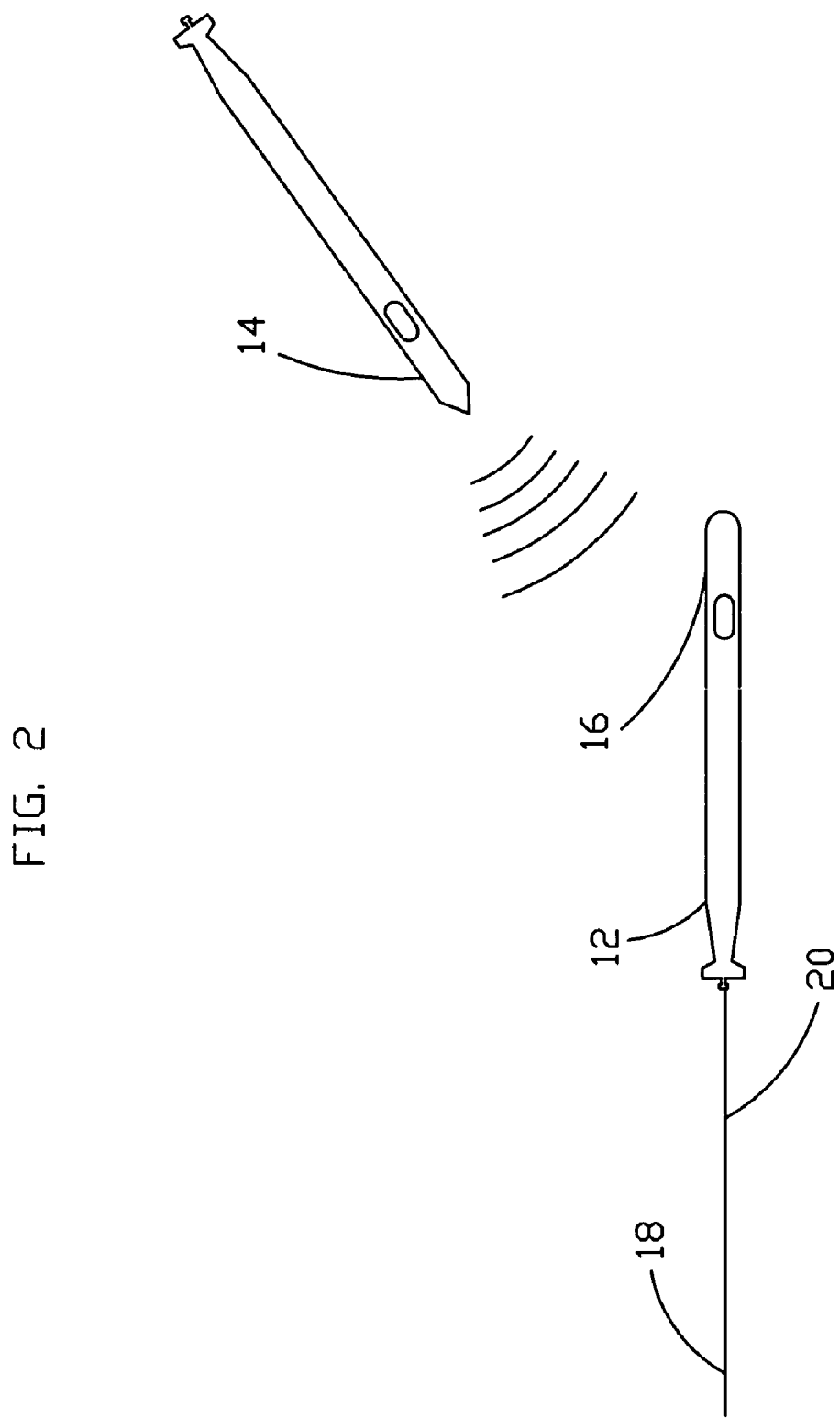
FIG. 2 is a schematic diagram for a close range sonar for which the above system is operable in accord with the present invention.

Referring now to the drawings, and more particularly to FIG. 1, there is shown a block diagram of close range sonar 10 in accord with the present invention which may be utilized in the situation shown in FIG. 2 by submarine 12 to avoid impending close encounter with surface vessel or submarine 14 that is approaching from the generally forward direction.

In a preferred embodiment, a platform, such as, a surface ship, an unmanned underwater vehicle or a submarine 12 preferably comprises at least two distinct passive sonar arrays which are separated a suitable distance from each other such that the received signals, such as ownship noise, from each sonar array is substantially uncorrelated. Hull sonar array 16 is preferably mounted or embedded over the hull surface of the submarine. Towed sonar passive array 18 may be disposed at a selectable distance from submarine 12 by use of preferably retractable cable 20. By adjusting the length of cable 20, towed array 18 may be provided at a suitable distance whereby noise received by the two sonar arrays 16 and 18 is substantially uncorrelated.

The time which submarine 12 has to react to avoid platform 14 may be determined from the following equation:

$$T=60(D_i-D_s)/(2R)$$

where:

$D_i$=the initial distance of detection (in kyd). This distance is a function of the environment and the own ship sensors suite.

$D_s$=the desired standoff or safety margin distance (in kyd).

T=the time to react (in minutes)

R=the rate of closure (in knots)

Example: Two platforms are moving towards each other at 5 knots with initial detection at 4 kyd and 2 kyd desired standoff.

The time to react is then:

$$T=60(4-2)/[2(5+5)]=120/20=6 \text{ minutes.}$$

As used herein, any closing between two platforms less than $D_s$, the desired standoff, is considered a close encounter. The rapid close passing by of two platforms is sometimes referred to as a "Zoof" by those of skill in the art.

The signals produced by sonar arrays 16 and 18 are utilized by close range sonar processor 10. Accordingly, beamformer 22 may be utilized to operate on signals received by sonar array 16. Beamformer 24 may be utilized to operate on signals received by sonar array 18. It is generally known that beamformers, or the process of beamforming, is utilized to sum up voltages proportional to acoustic pressure from the plurality of sensors on a sonar array with appropriate delays so that the source signal sums coherently and the noises add incoherently. Thus, beamforming reduces signal distortion and noise and provides for a higher output signal-to-noise ratio.

The output of beamformers 22 and 24 is applied to SCOT transform 26. SCOT transforms are well known and act as a smoothed coherence transform. SCOT transform 26 provides the function of a generalized cross correlation of the outputs of beamformers 22 and 24. However, other cross-correlation transforms besides SCOT may be utilized instead of or in conjunction with SCOT transform 26. Accordingly, SCOT transform 26 provides cross-correlation which multiplies and integrates the received signals from beamformers 22 and 24 for various time delays to thereby yield a peak signal that corresponds to the delay of the signals due to the bearing direction from which the signals originated. SCOT transform 26 may comprise filtering prior to the cross-correlation to improve the signal-to-noise ratio. The overall effect of SCOT transform 26 is to notch out the tonal components of strong signals and noise to thereby improve the output display.

The output of SCOT transform 26 is then multiplied by a delayed weighting as indicated in 28. Thus, the signal produced by the appropriate delay corresponding to the direction from which the signals originated is amplified. Bearing of the incoming signal produced with respect to time may be viewed at display 30.

The time domain signal is then applied to FFT 32 for transforming to the frequency domain such that the signal is broken down into separate frequencies to show the power spectrum of the signal. This process may have several benefits. For instance, the bandwidth of the desired signal can be determined so that signals outside the bandwidth can be discarded but that the entire bandwidth of the signal is included to thereby maximize the signal to noise ratio. The frequency content of the signals from a contact or target may also provide vital information about the identity and operation, such as the identity of platform 14. As well, these frequencies are also subject to the Doppler shift and, therefore, may provide information about the target velocity, such as the velocity of platform 14. Additional processing may also provide a closing vessel warning system as discussed hereinafter.

The magnitude of frequency domain information from FFT 32 is squared in block 33. This squared signal is simultaneously applied to long exponential average block 34 and short exponential average block 36. The long term signal averaging of block 34 is preferably on the order of tens of minutes and the short term signal averaging of block 36 is preferably on the order of tens of seconds. The outputs of block 34 and 36 are applied to block 38 for subtraction to determine the difference.

Three displays 40, 42, and 44 may be produced therefrom. These displays show different signals such that there is an appearance of a highly noticeable signal that appears rapidly as, for instance, submarine or other platform 14 is about to pass ownship 12 in FIG. 2. LOFAR display 42 may also be utilized to show unique spectral characteristics of signals received that may, for instance, be utilized to identify platform 14. A LOFAR display sometimes refers to a low frequency array display. This type of display may also be used for other applications such as analyzing cellular telephone system signals.

In summary, in one embodiment of the invention, system 10 provides two sonar arrays 16 and 18 which experience different types of noise, or uncorrelated noise, as well as the desired signal. Cross correlation of the received signal by SCOT cross-correlator 26 in the overlapped frequency range of these two sonar arrays or sensors cancels own ship interference by rejecting uncorrelated noise and, thereby, will allow for improved detection of contacts, as well as resolving port/starboard ambiguity for better localization. Additional frequency analysis utilizing FFT 32 and subsequent displays 40, 42, and 44 of processed signals, provide for a visual indicator of a close encounter, or Zoof. Display 42 is a LOFAR display. Accordingly, by correlation as discussed above, the desired signal can be amplified while the noise can be filtered out.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. An underwater platform close range sonar system for close range operations, comprising:

a first sonar array mounted to an ownship hull, said first sonar array being operable for detecting acoustic pressure waves from another platform and acoustic pressure waves comprising a first sonar array noise from said ownship hull;

a second sonar array having an extendable cable attached thereto, said extendable cable also attached to the hull to secure said second sonar array thereto, said second sonar array being operable for detecting acoustic pressure waves from said another platform and acoustic pressure waves comprising a second sonar array noise from the hull, said cable being extended to a length such that said first sonar array noise and said second sonar array noise is substantially uncorrelated;

a first beamformer for receiving signals related to said acoustic pressure waves detected by said first sonar array;

a second beamformer for receiving signals related to said acoustic pressure waves detected by said second sonar array; and a correlator for correlating respective outputs from said first beamformer and said second beamformer to thereby minimize said first sonar array noise and said second sonar array noise.

2. The system of claim 1, further comprising a bearing-time display operable from an output of said correlator.

3. The system of claim 1, wherein said correlator comprises a SCOT transform.

4. The system of claim 1, further comprising a time domain to frequency domain transfer function for operating on an output of said correlator.

5. The system of claim 4, further comprising a long averaging module, providing a long averaging signal, and a short averaging module, providing a short averaging signal, for simultaneously operating on an output of said time to frequency domain transfer function.

6. The system of claim 5, further comprising a subtractor for subtracting a long averaging signal with respect to a short averaging signal to provide a subtracted signal.

7. The system of claim 6, further comprising:

a first display operatively connected to said long averaging signal, a second display operatively connected to said short averaging signal and a third display operatively connected to said subtracted signal from said subtractor, said first display, said second display, and said third display being operable for indicating a close encounter between the hull and said another platform.

8. A method for close range sonar processing said method comprising:

mounting a first sonar array to an ownship hull;

receiving acoustic signals from said first sonar array related to another underwater platform and a first sonar array noise;

providing a second sonar array attached to a cable extended from the hull;

receiving acoustic signals from said second sonar array related to said another platform and a second sonar array noise;

beamforming said acoustic signals received by said first sonar array and said second sonar array;

correlating outputs of said beamforming to minimize said first sonar array noise and said second sonar array noise while maximizing sonar signals related to said another platform; and determining a position of said another platform with respect to said ownship hull for avoiding a close encounter therebetween.

9. The method of claim 8, further comprising displaying a time range bearing of said another underwater platform with respect to said ownship hull.

10. The method of claim 8, further comprising transforming a signal from said step of correlating to a frequency domain and averaging said transformed signal by simultaneously averaging over a first period and a second period wherein said first period is longer than said second period.

11. The method of claim 10, further comprising displaying signals from said averaging over said first period and said second period.

12. The method of claim 10, further comprising subtracting signals from said averaging over said first period and said second period.

13. The method of claim 12, further comprising producing a LOFAR display from signals produced in response to said step of subtracting.

* * * * *